(12) United States Patent
Lee et al.

(10) Patent No.: US 8,389,152 B2
(45) Date of Patent: Mar. 5, 2013

(54) POUCH TYPE POLYMER BATTERY PACK

(75) Inventors: Hyung Bok Lee, Yongin-si (KR); Heui Sang Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/244,432

(22) Filed: Sep. 24, 2011

(65) Prior Publication Data

US 2012/0015217 A1 Jan. 19, 2012

Related U.S. Application Data

(63) Continuation of application No. 11/374,857, filed on Mar. 13, 2006, now Pat. No. 8,227,108.

(30) Foreign Application Priority Data

Mar. 25, 2005 (KR) .......... 10-2005-0025170

(51) Int. Cl.
*H01M 2/00* (2006.01)
*H01M 14/00* (2006.01)
*H01M 2/02* (2006.01)

(52) U.S. Cl. .......... 429/163; 429/7; 429/170; 429/171

(58) Field of Classification Search .......... 429/163, 429/7, 170, 171
See application file for complete search history.

(56) References Cited

U.S. PATENT DOCUMENTS

| | | | |
|---|---|---|---|
| 5,591,540 A | 1/1997 | Louie et al. | |
| 5,916,704 A | 6/1999 | Lewin et al. | |
| 6,048,638 A | 4/2000 | Pendalwar | |
| 6,296,967 B1 | 10/2001 | Jacobs et al. | |
| 6,461,757 B1 | 10/2002 | Sasayama et al. | |
| 6,468,690 B1 | 10/2002 | Barker et al. | |
| 6,515,449 B1 | 2/2003 | Thomas et al. | |
| 6,524,732 B1 | 2/2003 | Iwaizono et al. | |
| 6,676,714 B2 | 1/2004 | Langan | |
| 6,902,844 B2 | 6/2005 | Yageta et al. | |
| 7,166,389 B2 | 1/2007 | Hiratsuka et al. | |
| 2001/0033962 A1 | 10/2001 | Suzuki | |
| 2002/0022180 A1 | 2/2002 | Olsen et al. | |

(Continued)

FOREIGN PATENT DOCUMENTS

| CN | 1298212 A | 6/2001 |
|---|---|---|
| CN | 1411081 A | 4/2003 |

(Continued)

OTHER PUBLICATIONS

U.S. Office action dated Sep. 16, 2009, for parent U.S. Appl. No. 11/374,857, 14 pages.

(Continued)

*Primary Examiner* — Patrick Ryan
*Assistant Examiner* — Julian Anthony
(74) *Attorney, Agent, or Firm* — Christie, Parker & Hale, LLP

(57) ABSTRACT

A polymer battery pack includes a core pack having a protective circuit module attached to a bare cell, a case having the core pack coupled thereto, the protective circuit module having a portion exposed to an exterior of the case, and a resin enclosing at least a portion of the protective circuit module that is exposed to the exterior of the case. A method of manufacturing a polymer battery pack includes forming a bare cell, forming a core pack having a protective circuit module, coupling the core pack to an interior of the case such that the protective circuit module is exposed to an exterior of the case, and molding the protective circuit module with a resin such that a terminal on the protective circuit module is exposed to an exterior of the resin.

16 Claims, 14 Drawing Sheets

U.S. PATENT DOCUMENTS

| | | | |
|---|---|---|---|
| 2002/0106555 | A1 | 8/2002 | Langan |
| 2003/0082445 | A1 | 5/2003 | Smith et al. |
| 2003/0165736 | A1 | 9/2003 | Hiratsuka |
| 2003/0180582 | A1 | 9/2003 | Masumoto et al. |
| 2004/0029001 | A1 | 2/2004 | Yamazaki et al. |
| 2004/0149375 | A1 | 8/2004 | Huang et al. |
| 2005/0014036 | A1 | 1/2005 | Kim |
| 2005/0151514 | A1 | 7/2005 | Kozu et al. |
| 2005/0175889 | A1 | 8/2005 | Han |
| 2005/0282069 | A1 | 12/2005 | Kim et al. |
| 2006/0099503 | A1 | 5/2006 | Lee |

FOREIGN PATENT DOCUMENTS

| | | | |
|---|---|---|---|
| CN | 1574415 A | | 2/2005 |
| EP | 1 107 336 A2 | | 6/2001 |
| EP | 1 111 696 A2 | | 6/2001 |
| EP | 1 403 942 A1 | | 3/2004 |
| EP | 1 473 785 A2 | | 11/2004 |
| JP | 2000-294207 | | 10/2000 |
| JP | 2001-176471 | | 6/2001 |
| JP | 2002-100326 | | 4/2002 |
| JP | 2002-134077 | | 5/2002 |
| JP | 2002-208767 | | 7/2002 |
| JP | 2002-298828 | | 10/2002 |
| JP | 2002-343905 | | 11/2002 |
| JP | 2003-282039 | | 10/2003 |
| JP | 2003-303580 | | 10/2003 |
| JP | 2004-047334 | | 2/2004 |
| JP | 2004-087219 | | 3/2004 |
| JP | 2005-079080 | | 3/2005 |
| KR | 10-2000-0073090 | | 12/2000 |
| KR | 10-0346378 | B1 | 7/2002 |
| KR | 10-2003-0067517 | | 8/2003 |
| KR | 10-2003-0096718 | | 12/2003 |
| KR | 10-2004-0014990 | | 2/2004 |
| KR | 10-2004-0027365 | | 4/2004 |
| KR | 10-2005-0022853 | | 3/2005 |
| KR | 2005-0088007 | | 9/2005 |
| WO | WO 03/081695 | | 10/2003 |

OTHER PUBLICATIONS

U.S. Office action dated Apr. 15, 2010, for parent U.S. Appl. No. 11/374,857, 9 pages.
U.S. Office action dated Dec. 8, 2010, for cross-reference U.S. Appl. No. 11/375,351, 21 pages.
U.S. Office action dated May 10, 2011, for cross-reference U.S. Appl. No. 11/375,351, 11 pages.
U.S. Office action dated Jun. 10, 2009, for cross-reference U.S. Appl. No. 11/362,559 (now U.S. Patent 7,682,735), 24 pages.
U.S. Office action dated Oct. 27, 2009, for cross-reference U.S. Appl. No. 11/375,351, 18 pages.
U.S. Office action dated Nov. 6, 2009, for cross-reference U.S. Appl. No. 11/362,559 (now U.S. Patent 7,682,735), 8 pages.
U.S. Office action dated Nov. 20, 2009, for cross-reference U.S. Appl. No. 11/540,855 now U.S. Patent 7,976,981), 11 pages.
U.S. Notice of Allowance dated Feb. 19, 2010, for cross-reference U.S. Appl. No. 11/540,855 (now U.S. Patent 7,976,981), 7 pages.
U.S. Notice of Allowance dated Jun. 4, 2010, for cross-reference U.S. Appl. No. 11/540,855 (now U.S. Patent 7,976,981), 7 pages.
U.S. Notice of Allowance dated Aug. 6, 2010, for cross-reference U.S. Appl. No. 11/540,855 (now U.S. Patent 7,976,981), 10 pages.
U.S. Office action dated Aug. 31, 2010, for parent U.S. Appl. No. 11/374,857, 12 pages.
U.S. Office action dated Feb. 9, 2011 for parent U.S. Appl. No. 11/374 857, 8 pages.
U.S. Notice of Allowance dated Feb. 15, 2011 for cross-reference U.S. Appl. No. 11/540,855 (now U.S. Patent 7,976,981), 8 pages.
U.S. Notice of Allowance dated Jul. 11, 2011 for parent U.S. Appl. No. 11/374,857.
U.S. Office action dated Oct. 6, 2011 for cross-reference U.S. Appl. No. 11/375,351, 11 pages.
Dictionary.com, LLC; http://dictionary.reference.com/browse/around; (2009), 5 pages.
English machine translation for Japanese Publication 2004-087219 listed above.
European Search Report dated Sep. 26, 2007, for European Patent application 06120961.5.
Japanese Office action dated Sep. 1, 2009, for Japanese Patent application 2006-061901.
Korean Patent Abstracts, Publication No. 10-2001-0046921, dated Jun. 15, 2001 corresponding to Korean Patent 10-0346378 listed above.
Korean Patent Abstracts, Publication No. 1020050088007 A, dated Sep. 1, 2005, in the name of Hyung Woo Jeon.
SIPO Office action dated Jan. 4, 2008, for Chinese Patent application 200610067992.5.
SIPO Office action dated Dec. 28, 2007, for Chinese Patent application 200610071476.X.
U.S. Office action dated Jul. 22, 2010, for related U.S. Appl. No. 11/375,531.
U.S. Office action dated Dec. 12, 2008, for related U.S. application for related U.S. Appl. No. 11/362,559.
U.S. Office action dated Dec. 30, 2008, for related U.S. application for related U.S. Appl. No. 11/540,855.
U.S. Office action dated Jun. 19, 2009, for related U.S. Appl. No. 11/540,855.
U.S. Office action dated Feb. 18, 2010, for related U.S. Appl. No. 11/375,351.
Japanese Office action dated Nov. 29, 2011, for Japanese Patent application 2006-0082653, corresponding to parent U.S. Appl. No. 11/374,857, 9 pages.
U.S. Notice of Allowance dated Dec. 22, 2011, for parent U.S. Appl. No. 11/374,857, 7 pages.
U.S. Office action dated Feb. 15, 2012, for cross reference U.S. Appl. No. 11/375,351, 12 pages.
U.S. Notice of Allowance dated Mar. 14, 2012, for parent U.S. Appl. No. 11/374,857, (7 pages).

POUCH TYPE POLYMER BATTERY PACK

CROSS-REFERENCE TO RELATED APPLICATION

This application is a continuation of U.S. patent application Ser. No. 11/374,857, filed Mar. 13, 2006, which claims priority to and the benefit of Korean Patent Application No. 10-2005-0025170, filed Mar. 25, 2005, the entire content of both of which is incorporated herein by reference.

BACKGROUND OF THE INVENTION

1. Field of the Invention

The present invention relates to a polymer battery pack and a method for manufacturing the same, and more particularly to a polymer battery pack having reinforced external strength and increased capacity and a method for manufacturing the same.

2. Description of the Prior Art

In general, a polymer battery pack includes a core pack having a protective circuit module connected to a pouch-type bare cell and a plastic case having all edges thermally bonded to it by ultrasonic waves with the core pack contained therein. The conventional, pouch-type bare cell refers to a lithium polymer battery having a polymer electrolyte and an electrode assembly, which includes a positive electrode, a separator, and a negative electrode, contained in a pouch made of cast polypropylene (CPP), aluminum, nylon, or polyethylene terephthalate (PET). The polymer battery pack and lithium polymer battery should be distinguished from battery packs and lithium ion batteries using a liquid electrolyte.

The polymer battery pack has a problem in that it is easily damaged by external impact and has degraded reliability, because both the pouch constituting a bare cell and the plastic case enclosing it have poor strength. In particular, the pouch is made of foil-type aluminum and the plastic case enclosing it has a small thickness. As a result, the polymer battery pack is easily deformed by external forces and is easily penetrated by sharp nails or needles. If such deformation or penetration occurs, the polymer battery pack may smoke, catch fire, or explode due to a short circuit.

The polymer battery pack has a rib space on each edge so that the plastic case can be welded thereto by ultrasonic waves. Such space occupies at least 0.8 mm and reduces the size of the core pack and bare cell accordingly, which is contained in the polymer battery pack. This results in decreased capacity. The fact that the core pack contained in the plastic case is substantially smaller than the plastic case makes it very difficult to contain a large-capacity core pack in the plastic case. In practice, conventional polymer battery packs typically cannot contain a core pack having a capacity of about 680 mAh or larger.

SUMMARY OF THE INVENTION

Accordingly, various embodiments of the present invention address the above-mentioned problems occurring in the prior art, and provide a polymer battery pack having reinforced external strength and increased capacity and a method for manufacturing the same.

In one embodiment of the invention, a polymer battery pack includes a core pack having a protective circuit module attached to a bare cell, a case having the core pack coupled thereto, the protective circuit module having a portion exposed to an exterior of the case, and a resin enclosing at least a portion of the protective circuit module that is exposed to the exterior of the case.

The bare cell may include an electrode assembly having a first electrode plate, a second electrode plate, and a separator interposed therebetween, tabs extending by a length to an exterior of the electrode assembly while being connected to the first and second electrode plates, respectively, and a pouch enclosing the electrode assembly such that a length of the tabs is exposed to an exterior of the pouch.

The pouch can include a first insulation layer, a metal foil, and a second insulation layer. The first insulation layer may include cast polypropylene (CPP), the metal foil may include any one material selected from the group consisting of aluminum, steel, and stainless steel, and the second insulation layer may include any one material selected from the group consisting of nylon and polyethylene terephthalate (PET).

The protective circuit module may include a PCB having at least one electronic component mounted thereon, and at least one terminal positioned on a side of the protective circuit module while being exposed to an exterior of the resin. The protective circuit module may also be electrically connected to the tabs.

The case may have a shape of a container with a closed end distal to the protective circuit module, and may include long-sided portions spaced apart by a distance from each other, short-sided portions connecting ends of the long-sided portions to each other, and a bottom portion closing a common end of the long-sided portions and the short-sided portions. The case may also include any one material selected from the group consisting of aluminum, steel, and stainless steel, and may have a thickness of 0.1-0.2 mm.

In one embodiment, the resin includes a hot-melt resin which melts at a temperature of 140-160° C., and the protective circuit module and a region of the bare cell, on which it is protrude from the case and are molded together with the resin. The protective circuit module may be with the resin and coupled to the case to be electrically connected to the core pack. In one embodiment, the protective circuit module has at least one terminal formed thereon exposed to an exterior of the resin.

A method for manufacturing a polymer battery pack according to one embodiment of the invention includes forming a bare cell by locating and sealing an electrode assembly in a pouch; forming a core pack by connecting a protective circuit module having a terminal to an exterior of the bare cell; coupling the core pack to an interior of a case such that the protective circuit module and a region of the bare cell, on which it is seated, are exposed to an exterior of the case; and molding a resin by molding the protective circuit module, which is exposed to the exterior of the case, and the region of the bare cell, on which it is seated, with a resin such that the terminal is exposed to an exterior of the resin.

A method for manufacturing a polymer battery pack according to another embodiment of the invention includes forming a bare cell by locating and sealing an electrode assembly in a pouch; molding a resin by providing a protective circuit module having a terminal and molding the protective circuit module with a resin such that the terminal is exposed to an exterior of the resin; coupling the bare cell to an interior of a case such that a region, on which the protective circuit module molded with the resin is to be seated, is exposed to an exterior of the case; and seating and connecting the protective circuit module, which has been molded with the resin, to the region of the bare cell which is exposed to the exterior of the case.

The polymer battery pack and the method for manufacturing the same according to some embodiments of the present invention are advantageous in that, since the pouch-type bare cell, which has a weak exterior, is coupled to a metallic case and the protective circuit module is molded with a resin, the external strength and reliability improve.

In addition, since the thickness of the case can be reduced to around 0.1-0.2 mm, the capacity can increase as much as the space is reduced. Particularly, a space of about 0.8 mm is necessary for thermal bonding of the case using ultrasonic waves according to the prior art. However, the present invention does not need such a space. This makes it possible to actually contain a bare cell (or core pack) having a capacity of 850 mAh or larger.

BRIEF DESCRIPTION OF THE DRAWINGS

The above and other features and aspects of the present invention will be more apparent from the following detailed description taken in conjunction with the accompanying drawings, in which.

DETAILED DESCRIPTION

Figure 1:
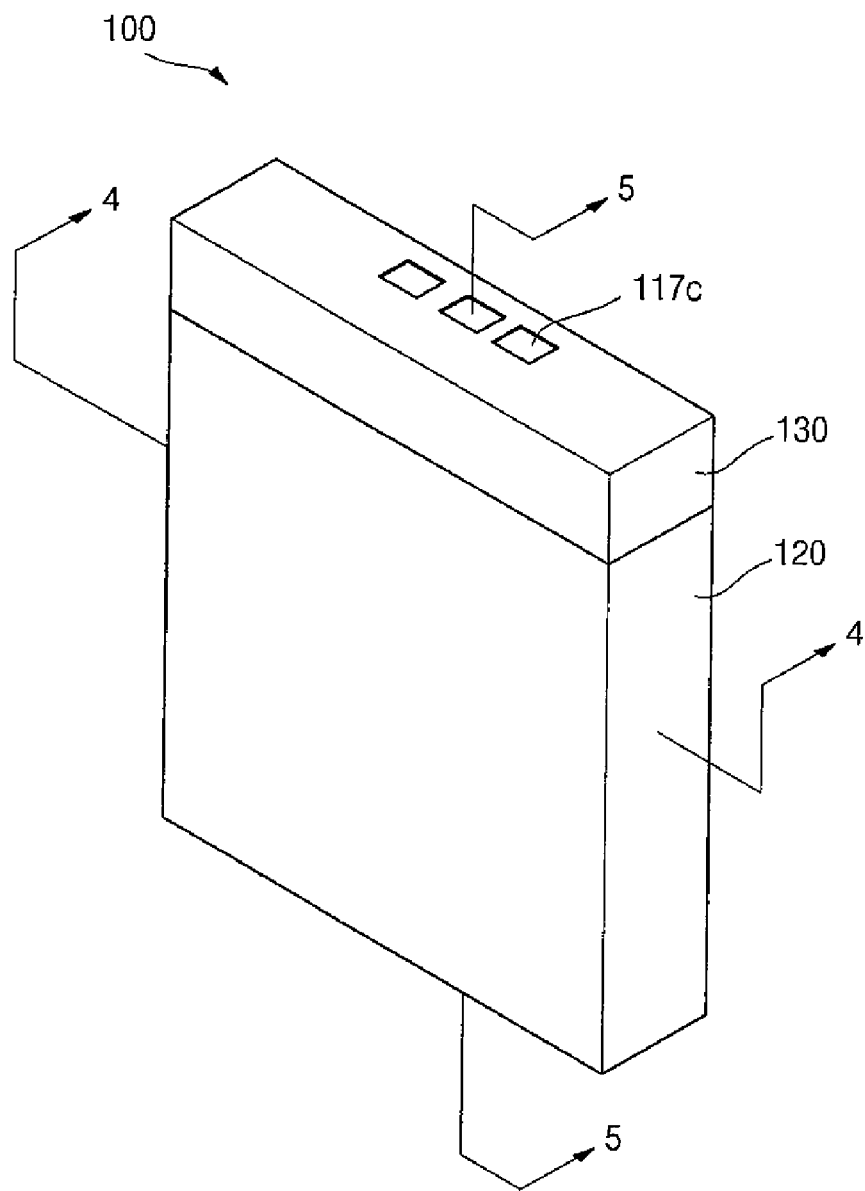
FIG. 1 is a perspective view showing a polymer battery pack according to an embodiment of the present invention.

Hereinafter, examples of embodiments of the present invention will be described with reference to the accompanying drawings. In the following description and drawings, the same reference numerals are used to designate the same or like components, and so repetition of the description on the same or like components will be omitted.

FIG. 1 is a perspective view showing a polymer battery pack according to an embodiment of the present invention.

As shown, the exterior of the polymer battery pack 100 according to an embodiment of the present invention includes a case 120 made of a metallic material and a resin 130 formed on top of the case 120. The case 120 and the resin 130 have an approximate shape of a rectangular hexahedron. At least one terminal 117c is exposed to the exterior of the resin 130.

Figure 2:
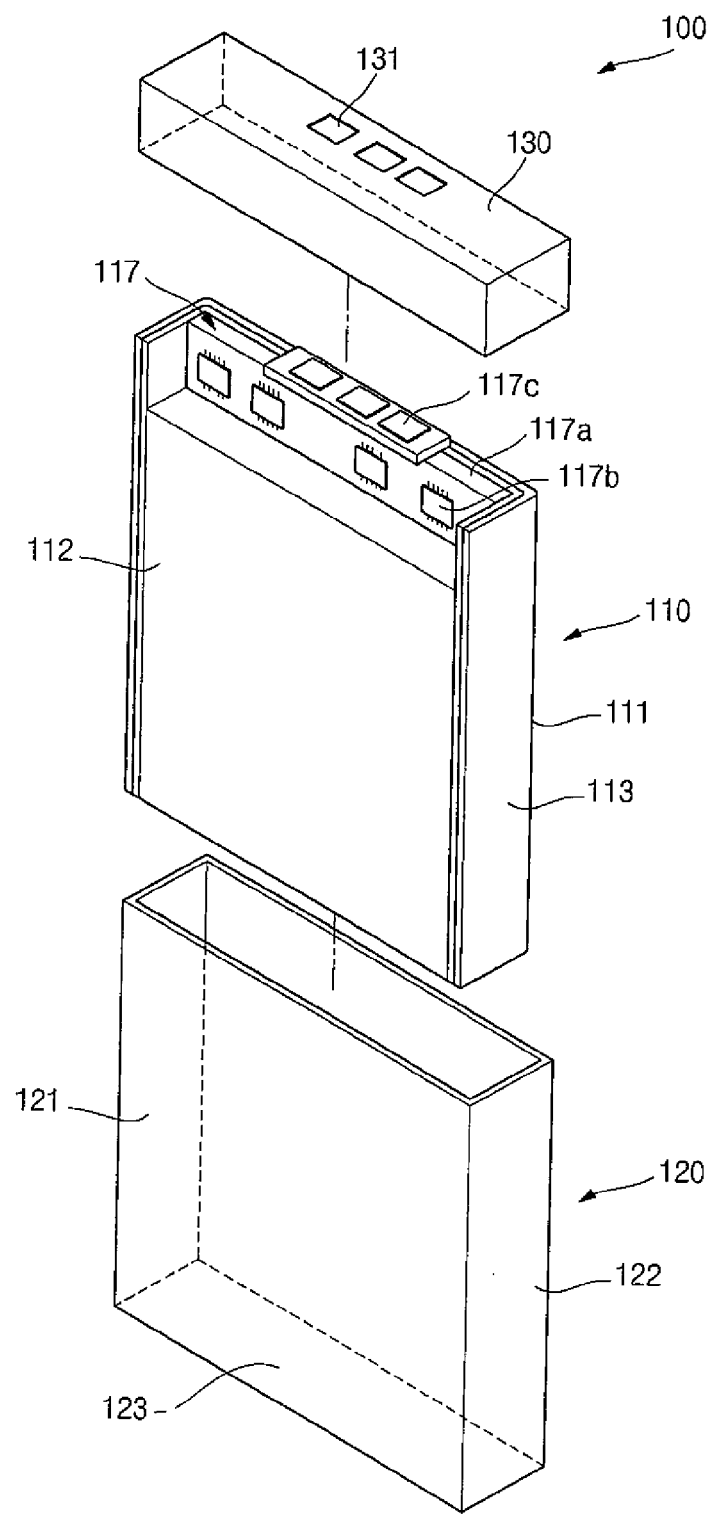
FIG. 2 is an exploded perspective view of the polymer battery pack shown in FIG. 1.

FIG. 2 is an exploded perspective view of the polymer battery pack 100 shown in FIG. 1.

As shown, the polymer battery pack 100 includes a core pack 110 having a protective circuit module 117 attached to a bare cell 111, a case 120 having the core pack 110 coupled thereto with part of the protective circuit module 117 exposed to the exterior, and a resin 130 enclosing the protective circuit module 117 except for the exposed part of the protective circuit module 117.

The bare cell 111, which forms the core pack 110 with the protective circuit module 117, may be a conventional lithium polymer battery. The pouch 112 constitutes the exterior of the bare cell 111. Portions of the pouch 112 are thermally bonded to one another in three directions. Particularly, two portions thereof facing each other are folded to minimize the size and, hereinafter, will be referred to as folded portions 113. The protective circuit module 117 is seated above the region between the folded portions 113. The protective circuit module 117 includes a PCB 117a, at least one electronic component 117b installed on the PCB 117a, and at least one terminal 117c installed on top of the PCB 117a.

The case 120 has the shape of a container having a closed end opposite to the protective circuit module 117. More particularly, the case 120 includes long-sided portions 121 having a larger area and spaced by a predetermined distance from each other, short-sided portions 122 having a smaller area and connecting both ends of the long-sided portions 121 to each other, and a bottom portion 123 positioned on the common end of the long-sided portions 121 and the short-sided portions 122 to close it. The opposite end to the bottom portion 123 is open. The long-sided portions 121, the short-sided portions 122, and the bottom portion 123 may be integrally formed by deep drawing of a metal primitive plate or may be separately prepared and welded to one another. However, the method for manufacturing the same according to the invention is not limited thereto.

The case 120 may be made of any one of an aluminum-based material, a steel-based material, a stainless steel-based material, and an equivalent thereof, which can be subjected to deep drawing and which is light or has large strength, but the material is not limited thereto.

The case 120, in this embodiment, has a thickness of about 0.1-0.2 mm so that it can contain a large-capacity (850 mAh or larger) core pack 110. Although a space of about 0.8 mm is necessary for thermal bonding using ultrasonic waves according to the prior art, the present invention does not need such a space and a larger core pack 110 can be contained in a case 120 having the same size as cases in the prior art. If the thickness of the case 120 is 0.1 mm or less, the case is easily torn off during deep drawing and, if the thickness is 0.2 mm or larger, it is difficult to be subjected to deep drawing and the case becomes heavier.

The entire height of the case 120 may be smaller than the height of the core pack 110. Specifically, the protective circuit 117 and a region of the core pack 110 around it are exposed to the exterior via the case 120 and protrude a predetermined length from it while the core pack 110 is inside the case.

The resin 130 encloses most of the protective circuit module 117 and a region of the core pack 110 around it. The terminal 117c of the protective circuit module 117, which may be connected to an external device, is exposed to the exterior via one of the openings 131 of the resin 130. The resin 130 may be a hot-melt resin or an equivalent thereof, which melts at a temperature of about 140-160° C., but the material is not limited thereto. Although the resin 130 is shown as a component separate from the protective circuit module 117, it may actually be formed in a molding process using a mold (not shown). More particularly, the case 120 is placed in a mold with the core pack 110 coupled thereto. Then, a resin 130 having high temperature and pressure is supplied towards the protective circuit module 117 and a region of the core pack 110 around it and is hardened. As a result, the resin 130 is shaped approximately into a rectangular hexahedron as shown in the drawing.

Figure 3:
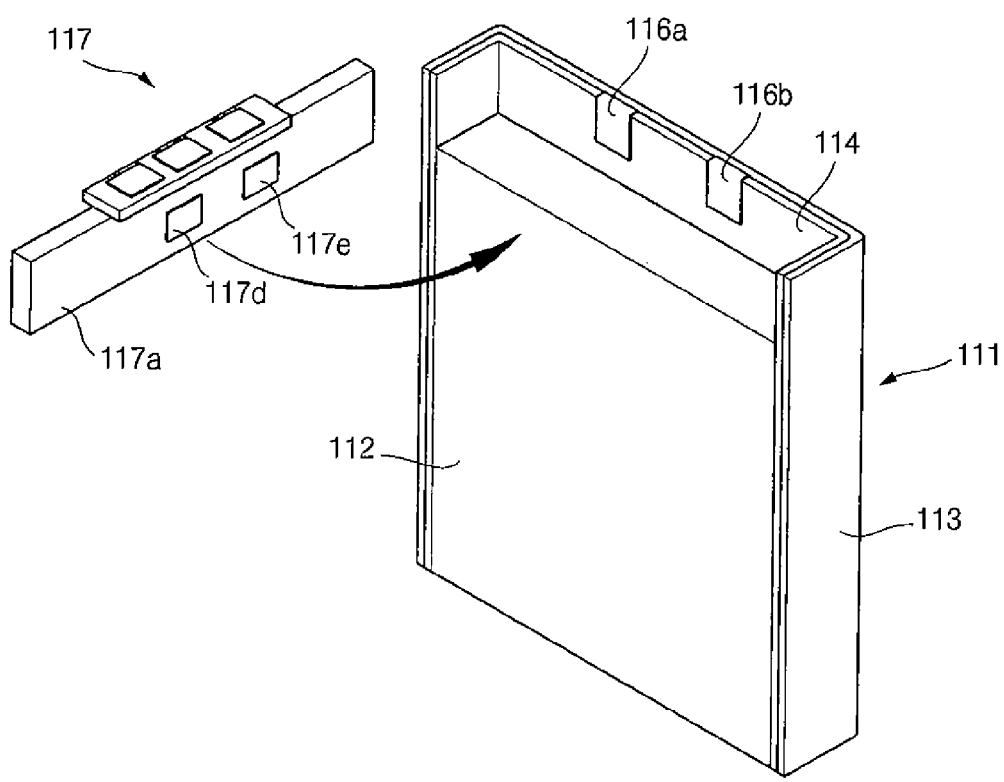
FIG. 3 is a perspective view showing the process of connecting a protective circuit module to a bare cell in the polymer battery pack shown in FIG. 1.

FIG. 3 is a perspective view showing the process of connecting the protective circuit module to the bare cell in the polymer battery pack shown in FIG. 1.

As shown, conductive tabs 116a and 116b are exposed to the upper region 114 of the bare cell 111 above the pouch 112 and extend by a predetermined length. The PCB 117a of the protective circuit module 117 has conductive pads 117d and 117e formed thereon to be electrically connected to the tabs 116a and 116b. The conductive pads 117d and 117e and the conductive tabs 116a and 116b are connected to each other by ultrasonic welding, laser welding, soldering, or the like, so that the protective circuit module 117 is stably seated in the upper region 114 of the bare cell 111.

Figure 4:
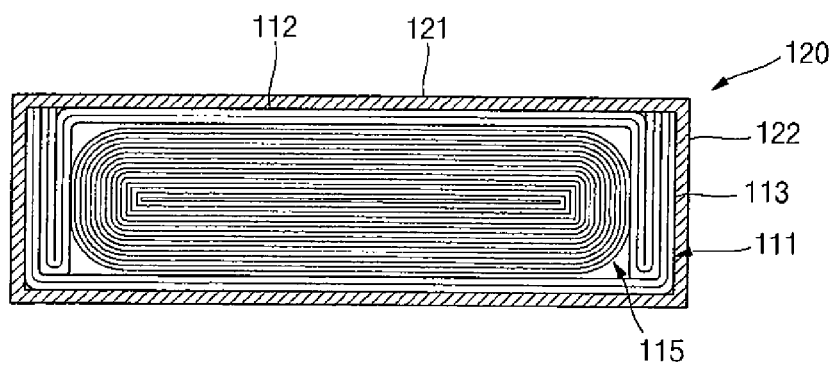
FIG. 4 is a sectional view taken along the line 4-4 of FIG. 1.

FIG. 4 is a sectional view taken along the line 4-4 of FIG. 1.

As shown, the bare cell 111 has an electrode assembly 115 positioned inside the pouch 112, which has been wound a number of times. The detail structure of the pouch 112 and the electrode assembly 115 will be described later. The folded portions 113 of the pouch 112, which are formed on opposite sides thereof, are bent in a predetermined direction to minimize the size occupied by the bare cell 111. The exterior of the pouch 112 is enclosed by the case 120. Specifically, the case 120 including the long-sided portions 121 and the short-sided portions 122 completely encloses the exterior of the pouch 112. As the case 120 made of a metallic material having high strength directly encloses the pouch 112 of the bare cell 111 having weak strength, the external strength improves. In addition, the case 120 needs no extra space for terminal bonding using ultrasonic waves as in the prior art and can contain a larger bare cell 111 accordingly. This increases the overall capacity.

Figure 5:
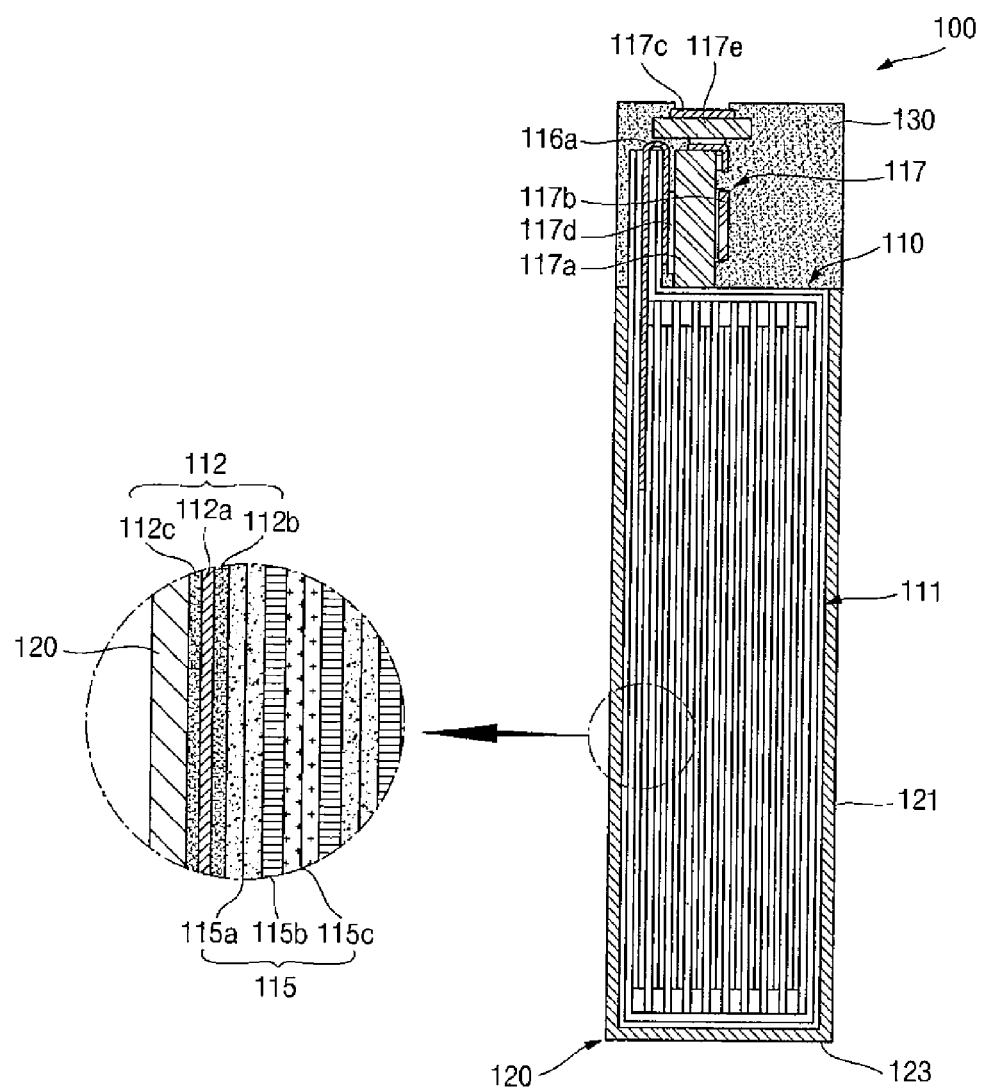
FIG. 5 is a sectional view taken along the line 5-5 of FIG. 1.

FIG. 5 is a sectional view taken along the line 5-5 of FIG. 1.

As shown, the polymer battery pack 100 enclosed by the case 120 and the resin 130 includes a bare cell 111, the interior of which is enclosed by the pouch 112. The pouch 112 has a metal foil 112a, a first insulation layer 112b formed on a surface of the metal foil 112a, and a second insulation layer 112c formed on the other surface thereof. The metal foil 112a may be made of any one material chosen from aluminum, steel, stainless steel, and an equivalent thereof, but the material is not limited thereto. The first insulation layer 112b may be made of any one material chosen from cast polypropylene (CPP) and an equivalent thereof, the second insulation layer 112c may be made of any one material chosen from nylon, polyethylene terephthalate (PET), and an equivalent thereof, but the material is not limited thereto in the present invention.

The pouch 112 has an electrode assembly 115 positioned therein. The electrode assembly 115 includes a first electrode plate 115a, a separator 115b, and a second electrode plate 115c, which are wound a number of times. The first electrode plate 115a may have a first collector, the surface of which is coated with a first active material. The second electrode plate 115c may have a second collector, the surface of which is coated with a second active material. For example, the first electrode plate 115a may be a positive electrode, the first collector may be made of aluminum foil, and the first active material may be lithium oxide. In addition, the second electrode plate 115c may be a negative electrode plate, the second collector may be made of copper foil, and the second active material may be a carbon-based material. The first conductive tab 116a protrudes by a predetermined length from the exterior of the pouch 112 while being connected to the first collector of the first electrode plate 115a. The second conductive tab 116b (FIG. 3) protrudes by a predetermined length from the exterior of the pouch 112 while being connected to the second collector of the second electrode plate 115c. In FIG. 5, only first conductive tab 116a is shown for clarity. The separator 115b is interposed between the first and second electrode plates 115a and 115c and is made of a porous material allowing only lithium ions to pass through.

The protective circuit module 117 is electrically connected to the conductive tab 116a, which extends by a predetermined length from the exterior of the pouch 112. Particularly, the protective circuit module 117 has a conductive pad 117d formed on its PCB 117a, which is electrically connected to the conductive tab 116a. Another conductive pad 117e (FIG. 3) is connected to the conductive tab 116b.

Referring again to FIG. 5, the protective circuit module 117 has a terminal 117c formed on the upper end of the PCB 117a while being positioned on an insulator 117f. The terminal 117c and the PCB 117a are electrically connected to each other.

Figure 6:
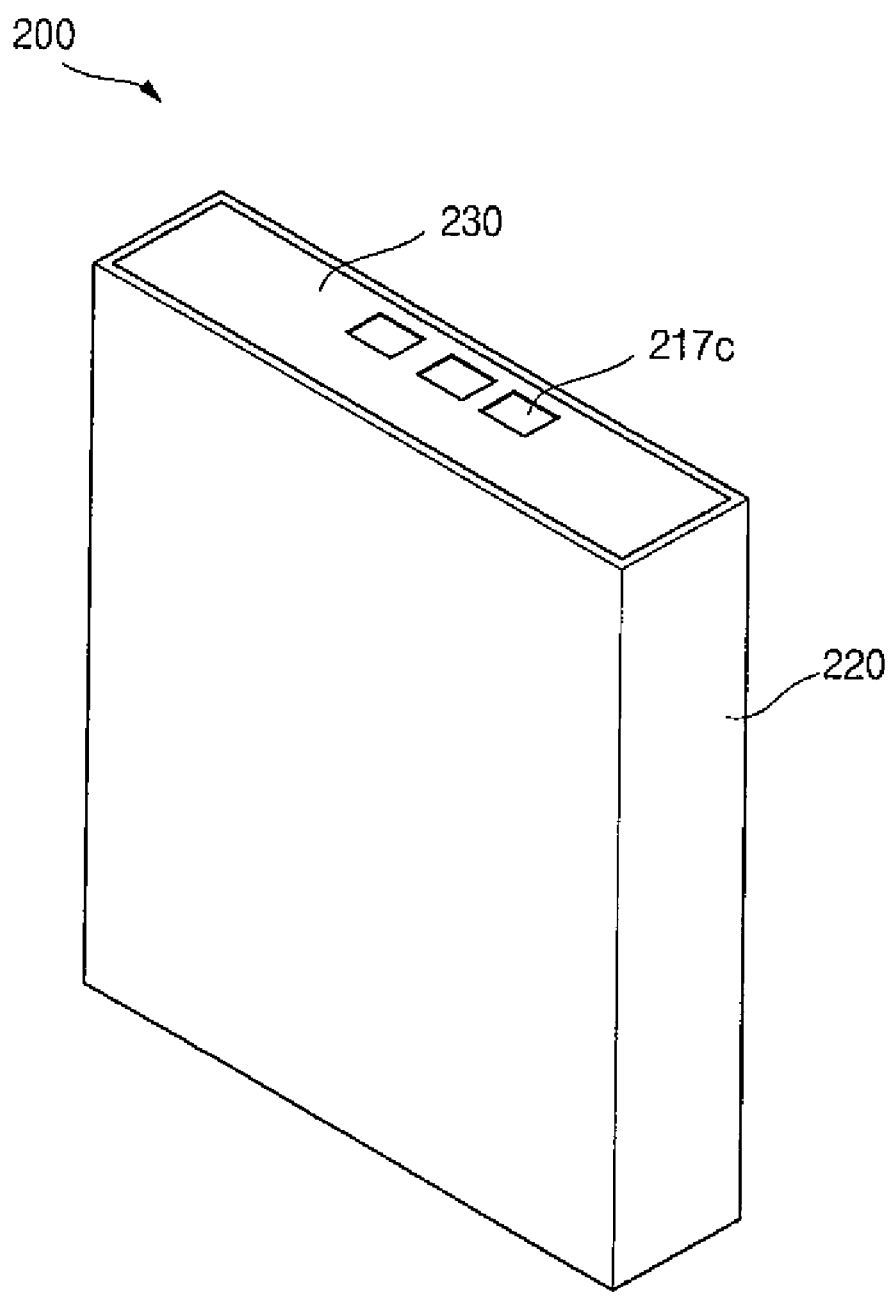
FIG. 6 is a perspective view showing a polymer battery pack according to another embodiment of the present invention.

FIG. 6 is a perspective view showing a polymer battery pack according to another embodiment of the present invention.

As shown, most of the exterior of the polymer battery pack 200 according to another embodiment of the present invention is enclosed by a metallic case 220. In particular, the height of the polymer battery pack 200 is almost identical to that of the case 220. However, a resin 230 is exposed to the exterior via the top of the case 220 and a terminal 217c is exposed via the resin 230. In the embodiment shown in FIGS. 1-5, four lateral surfaces of the resin 130, as well as its upper surface, are exposed to the exterior in the case of the polymer battery pack 100 according to the above-mentioned embodiment. In the embodiment shown in FIG. 6, however, only the upper surface of the resin 230 of the polymer battery pack 200 is exposed.

Figure 7:
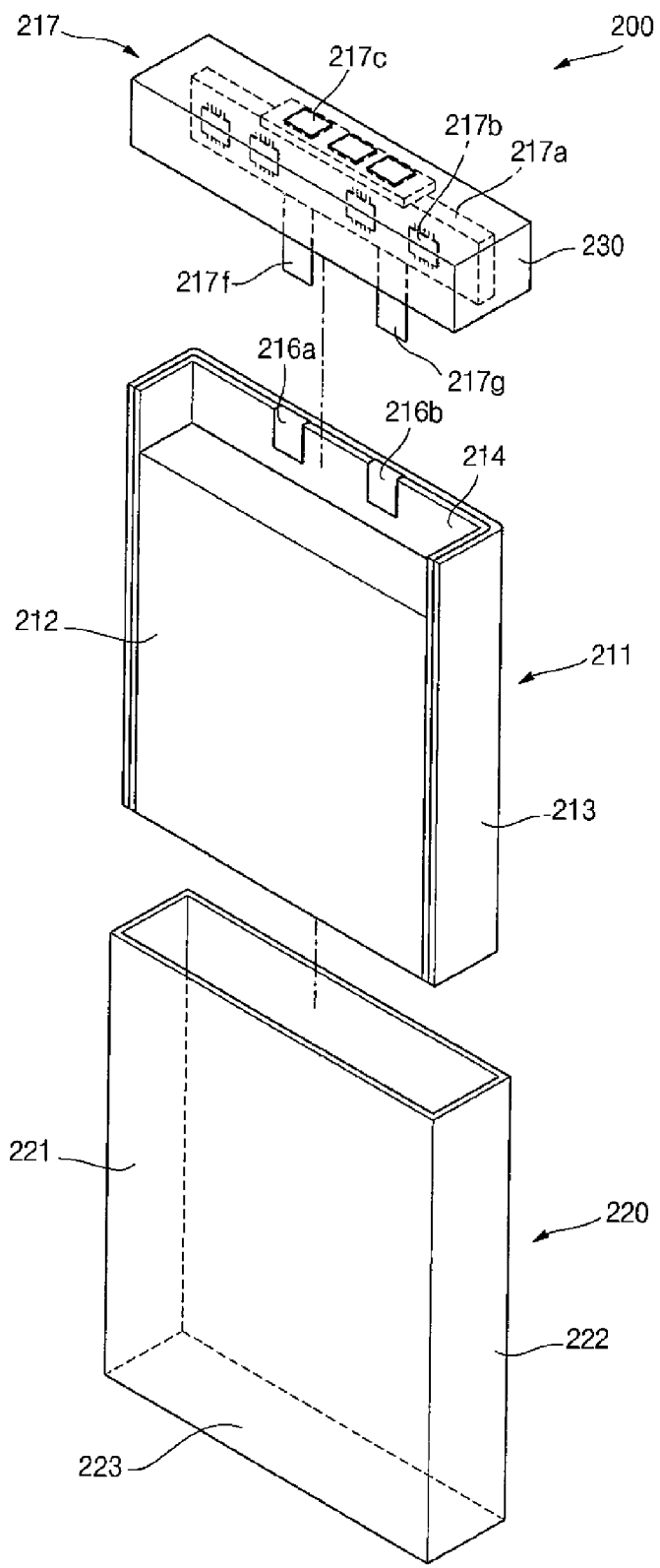
FIG. 7 is an exploded perspective view of the polymer battery pack shown in FIG. 6.

FIG. 7 is an exploded perspective view of the polymer battery pack 200 shown in FIG. 6.

As shown in FIGS. 6 and 7, the protective circuit module 217 of the polymer battery pack 200 is coupled to the case 220 after it is molded with the resin 230. In particular, the PCB 217a and the electronic component 217b, which constitute the protective circuit module 217, are previously molded with the resin 230 or an equivalent thereof. The PCB 217a has conductive tabs 217f and 217g extending by a predetermined length from the exterior of the resin 230 while being electrically connected to conductive tabs 216a and 216b formed on the bare cell 211.

The height of the bare cell 211 is slightly less than that of the case 220. Specifically, when the bare cell 211 is coupled to the case 220, a region of the bare cell 211 is exposed to the exterior of the case 220 but does not protrude from it. The conductive tabs 217f and 217g of the protective circuit module 217 molded with the resin 230 are electrically connected to the conductive tabs 216a and 216b of the bare cell 211, while the bare cell 211 is completely coupled to the case 220, and the protective circuit module 217 is coupled to the upper space of the case 220 to complete the polymer battery pack 200.

As most exterior of the battery pack 200 is enclosed by the metallic case 220, its strength and reliability further improve. If necessary, a waterproof adhesive may be additionally applied to the interface between the resin 230, which has previously been molded on the protective circuit module 217, and the case 220, lest alien substances and moisture should penetrate into the gap between them.

Figure 8:
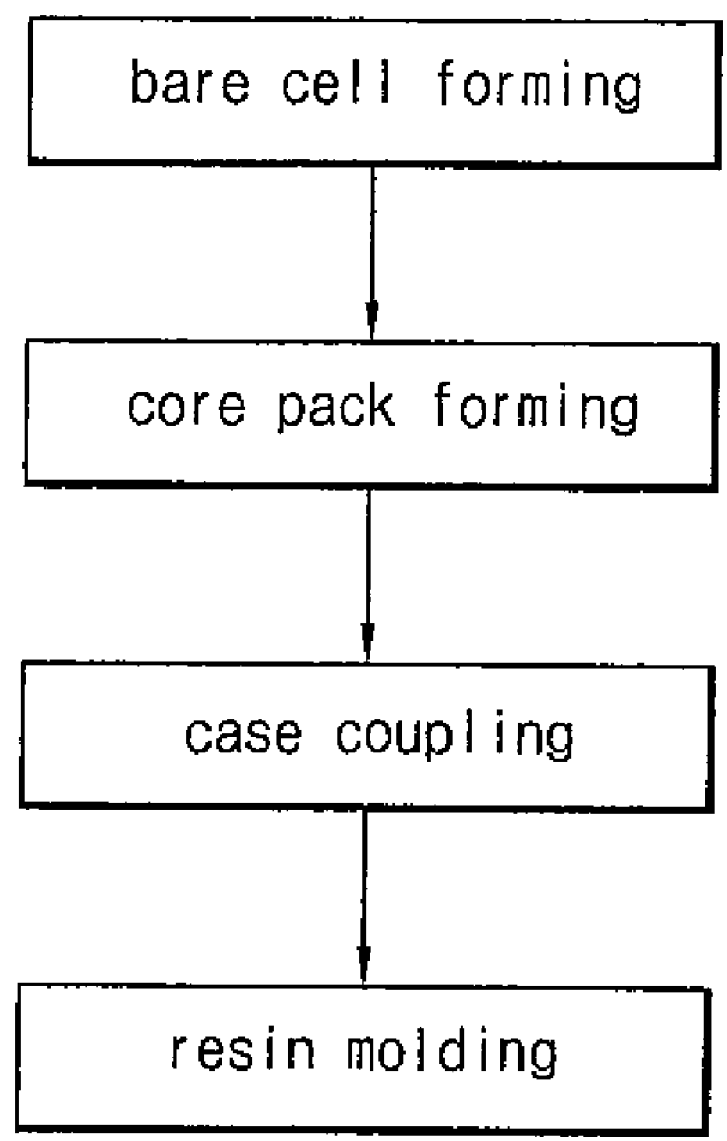
FIG. 8 is flow diagram showing a polymer battery pack at various stages of manufacture according one embodiment of a method of the present invention.

FIG. 8 is flow diagram showing a polymer battery pack at various stages of manufacture according one embodiment of a method of the present invention. FIGS. 8a to 8f are diagrammatic views showing a polymer battery pack at various stages of its manufacture according to one embodiment of a method of the present invention.

One embodiment of a method for manufacturing a polymer battery pack 100 according to the present invention includes a bare cell 111 forming step of containing an electrode assembly 115 in a pouch 112 and sealing it; a core pack 110 forming step of connecting a protective circuit module 117 having at least one terminal 117c to the exterior of the bare cell 111; a case 120 coupling step of coupling the core pack 110 to the interior in such a manner that the protective circuit module 117 and a region of the bare cell 111, in which it is seated, are exposed to the exterior; and a resin 130 molding step of molding the protective circuit module 117, which is exposed via the case 120, and a region of the bare cell 111, in which it is seated, with a resin 130 in such a manner that the terminal 117c of the protective circuit module 117 is exposed to the exterior.

Each step of this embodiment will now be described in more detail with reference to the drawings and repeated descriptions of the materials and characteristics of each component will be omitted for clarity.

Figure 8A:
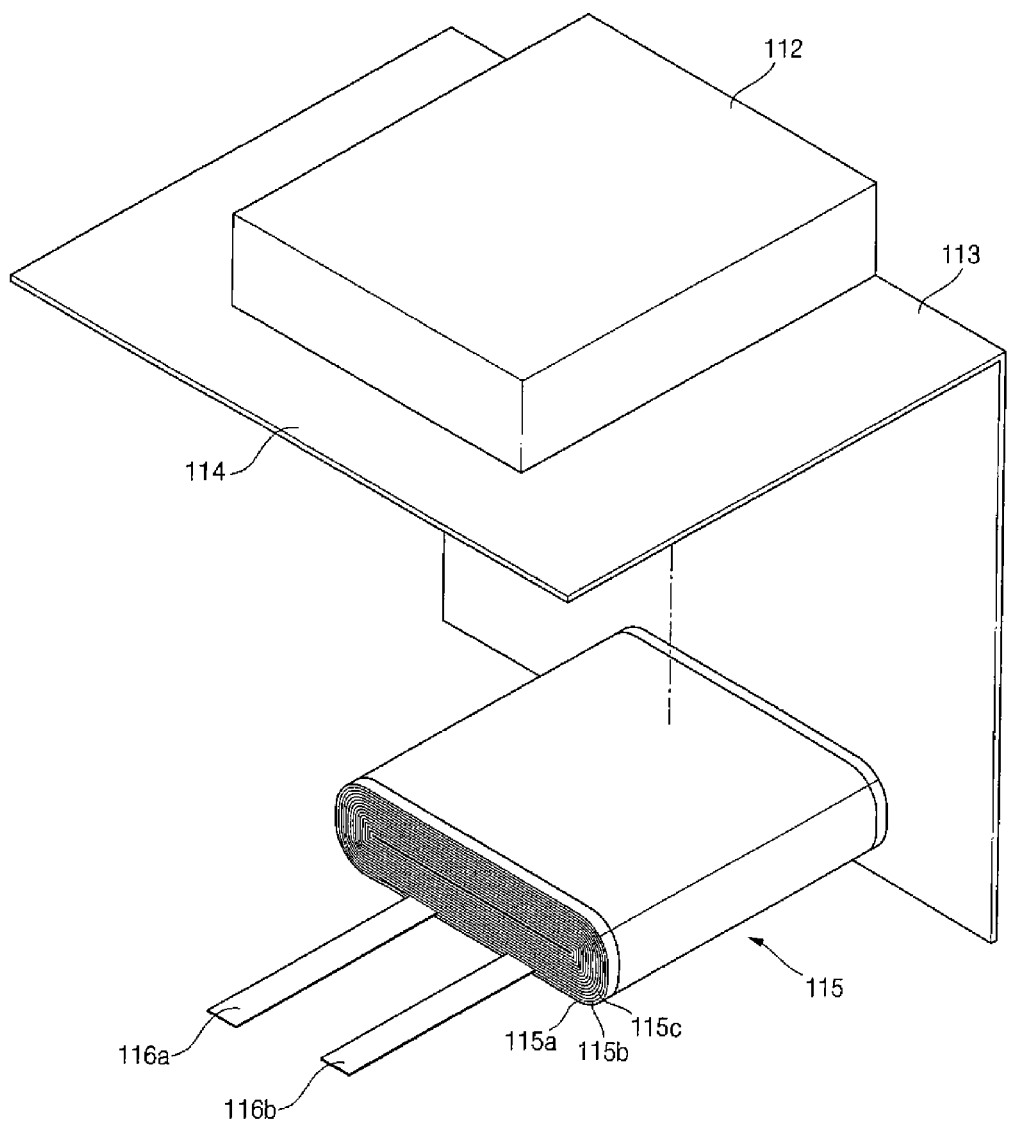
FIGS. 8a to 8f are diagrammatic views showing a polymer battery pack at various stages of manufacture according one embodiment of a method of the present invention.
Figure 8B:
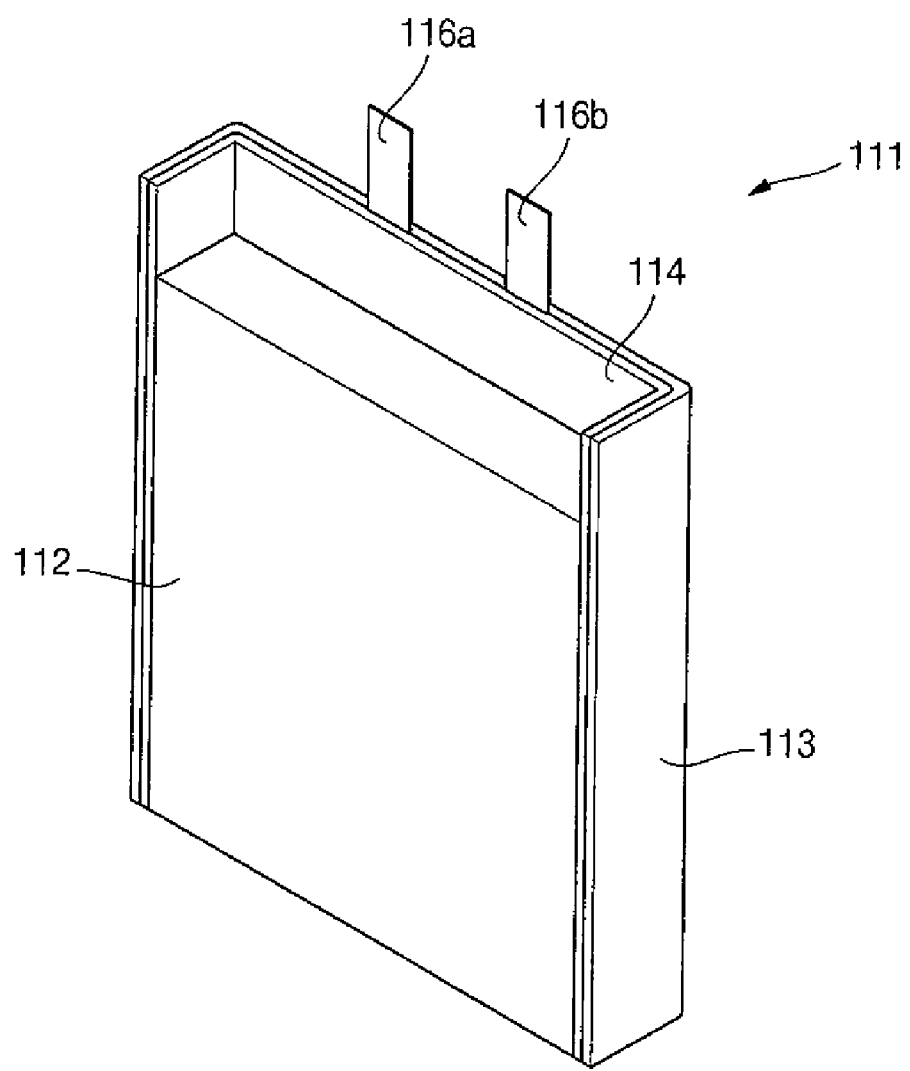

Referring to FIGS. 8a and 8b, a bare cell 111 forming step is shown.

In the bare cell 111 forming step, a first electrode plate 115a, a separator 115b, and a second electrode plate 115c are wound, and first and second conductive tabs 116a and 116b are connected to the first and second electrode plates 115a and 115c, respectively, to form an electrode assembly 115. The electrode assembly 115 is contained in a pouch 112 and sealed. The first and second conductive tabs 116a and 116b extend by a predetermined length from the exterior of the pouch 112 and are exposed to the exterior. Portions of the pouch 112 are thermally bonded to one another in three directions about the electrode assembly 115 to prevent the electrode assembly 115 from escaping to the exterior. After the thermal bonding, two portions of the pouch 112 facing each other are folded at a predetermined angle to minimize the size and form folded portions 113. The region adjacent to the portions from which the first and second conductive tabs 116a and 116b protrude to the exterior is also thermally bonded and, hereinafter, will be referred to as the first region 114.

Figure 8C:
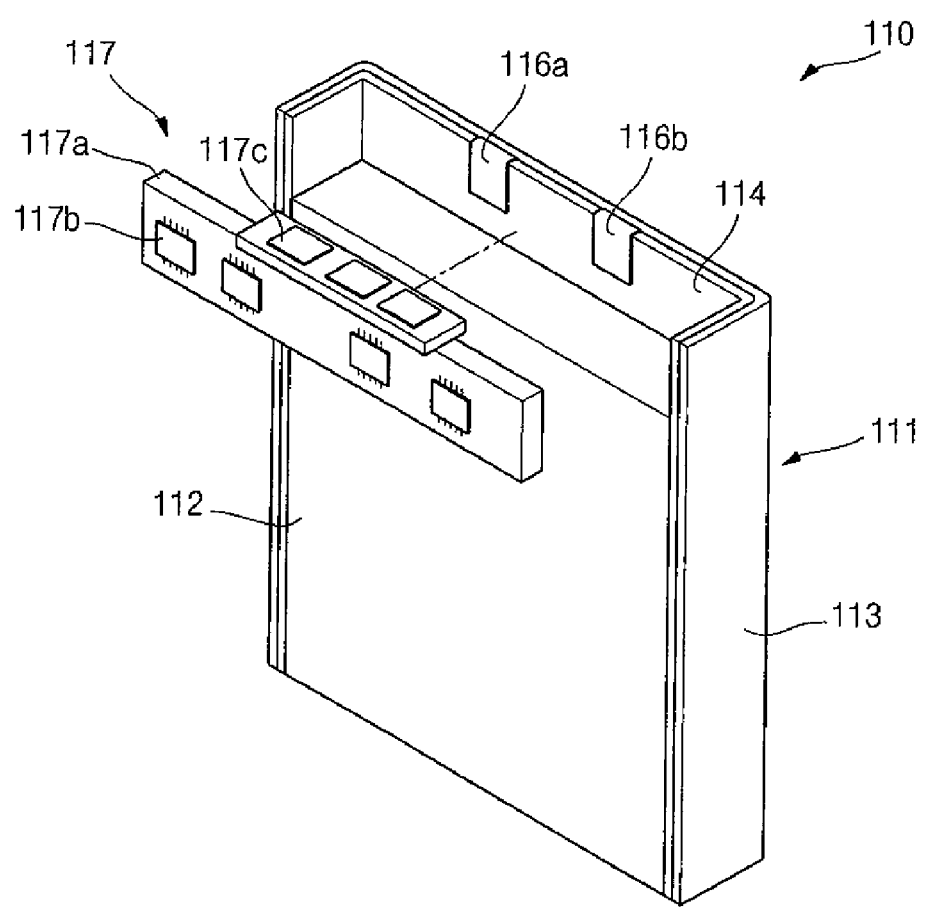

Referring to FIG. 8c, a core pack 110 forming step is shown.

In the core pack 110 forming step, a protective circuit module 117 is connected to the bare cell 111 mechanically and electrically. Particularly, a protective circuit module 117 including a PCB 117a, an electronic component 117b, and a terminal 117c, is connected to the conductive tabs 116a and 116b mechanically and electrically. The conductive tabs 116a and 116b are exposed to the exterior of the pouch 112 of the bare cell 111. The protective circuit module 117 is positioned in the first region 114 of the pouch 112 of the bare cell 111. The bare cell 111 having the protective circuit module 117 seated thereon is referred to as a core pack 110.

Figure 8D:
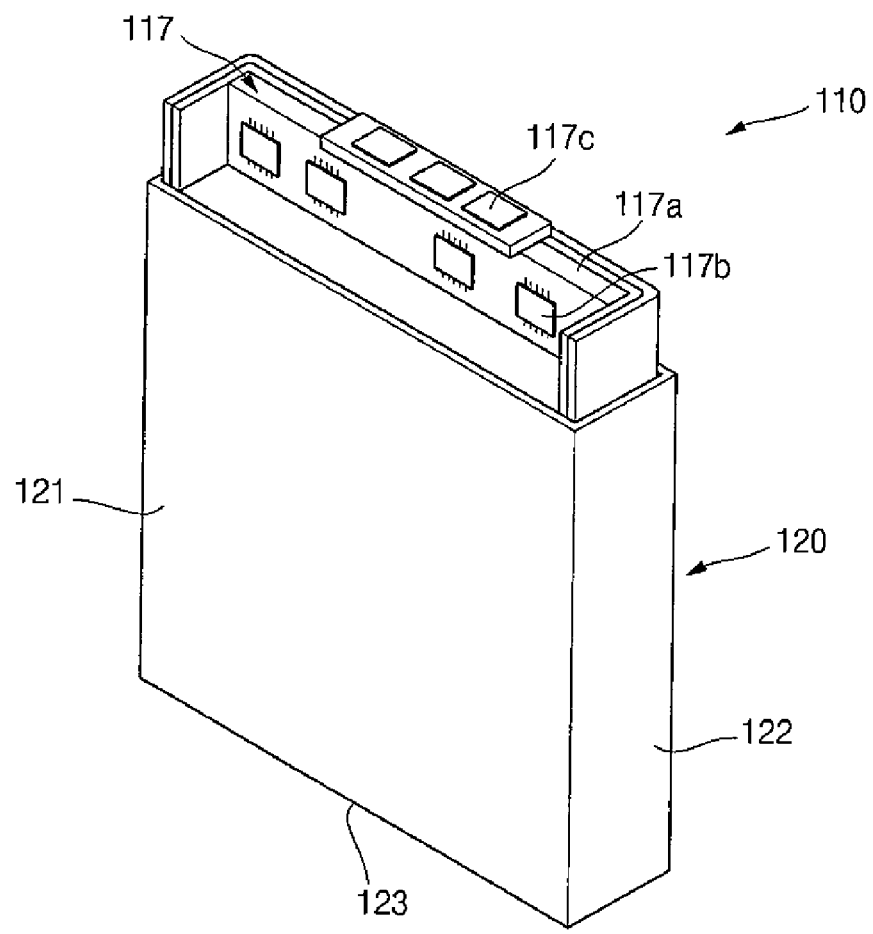

Referring to FIG. 8d, a case 120 coupling step is shown.

In the case 120 coupling step, the core pack 110 is coupled to a hollow case 120 including long-sided portions 121, short-sided portions 122, and a bottom portion 123. The case 120 is made of an aluminum-based material, a steel-based material, or a stainless steel-based material to secure rigidity and has a thickness of about 0.1-0.2 mm. The case 120 has a height corresponding to about 80-95% of that of the core pack 110 so that the protective circuit module 117 and a region around the core pack 110, on which it is seated, protrude from the case 120.

Figure 8E:
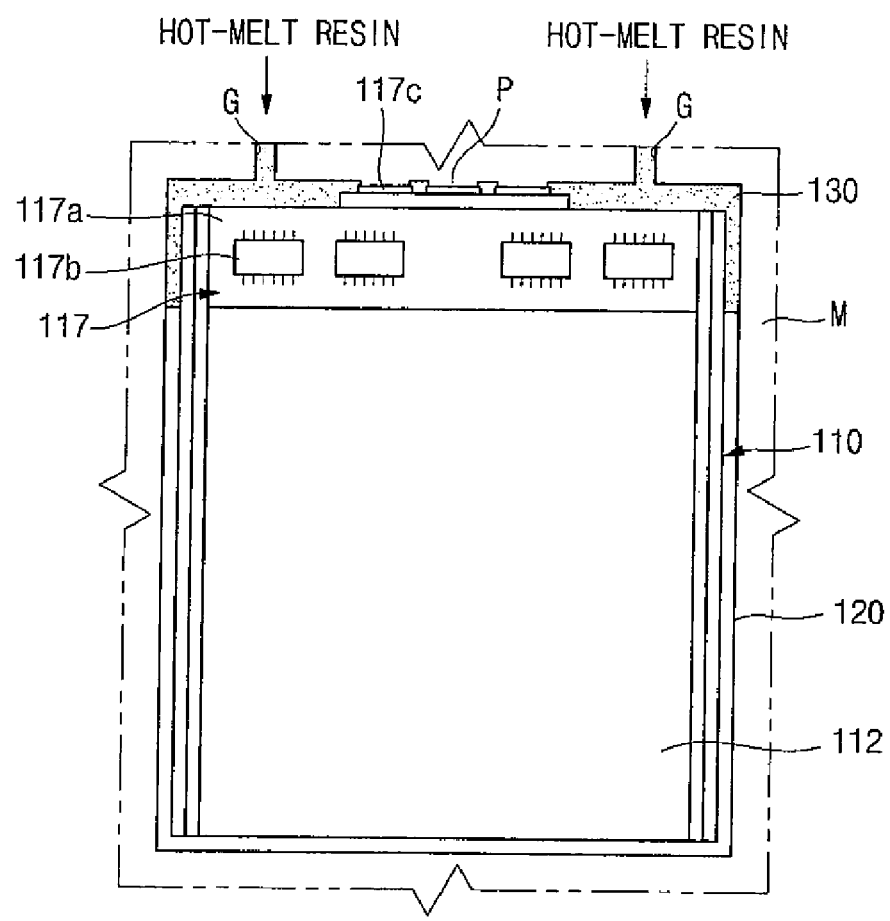
Figure 8F:
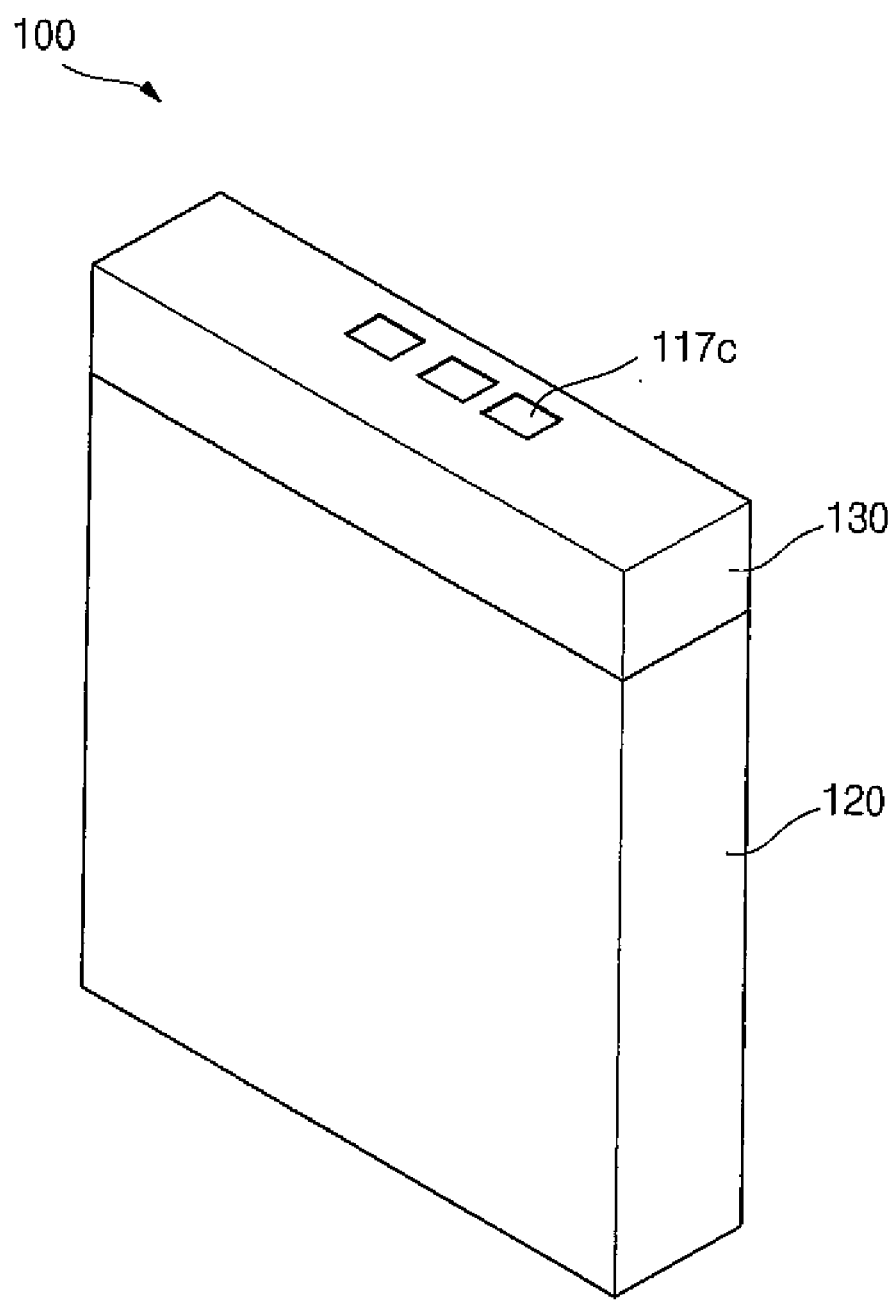

Referring to FIG. 8e, a resin 130 molding step is shown and, referring to FIG. 8f, a finished polymer battery pack 100 is shown.

In the resin 130 molding step, the core pack 110 enclosed by the case 120 is seated on a mold M having a predetermined shape. Little or no gap exists between the case 120 and the mold M. However, the protective circuit module 117 and a region of the core pack 110 around it have a gap between the mold M. A resin 130, having high temperature and pressure, fills the gap via a gate G and is cooled to a predetermined temperature for hardening. The terminal 117c of the protective circuit module 117 is fastened to a protrusion P formed on the mold M so that it is exposed to the exterior of the resin 130. The resin 130 may be a hot-melt resin or an equivalent thereof, which melts at a temperature of about 140-160° C., but the material is not limited thereto. After filling and cooling of the resin 130, the case 120 is removed from the mold M to obtain a polymer battery pack 110 as shown in FIG. 8f. Specifically, most of the polymer battery pack 100 is enclosed by the metallic case 120 and the upper portion thereof is molded with the resin 130, while only the terminal 117c is exposed to the exterior.

Instead of electrically connecting the protective circuit module 117 to the core pack 110 and molding it with the resin 130, the protective circuit module 217 may be previously molded with the resin 230 and enclosed by the case 220.

Figure 9:
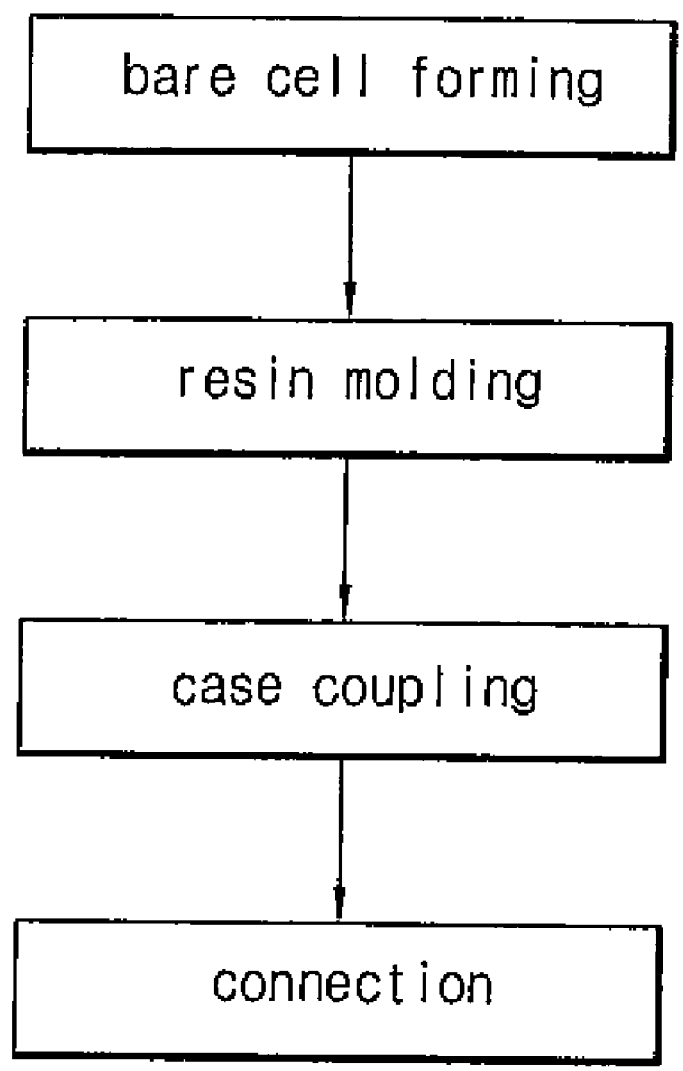
FIG. 9 is flow diagram showing a polymer battery pack at various stages of manufacture according another embodiment of a method of the present invention.

In particular, with reference again to FIGS. 6-7 and FIG. 9, an alternative method for manufacturing a polymer battery pack 200 according to one embodiment of the present invention includes a bare cell 211 forming step of containing an electrode assembly 215 in a pouch 212 and sealing it; a resin 230 molding step of providing a protective circuit module 217 having at least one terminal 217c and molding the protective circuit module 217 with a resin 230 in such a manner that the terminal 217c is exposed to the exterior; a case 220 coupling step of coupling the bare cell 211 to the interior in such a manner that a region, on which the protective circuit module 217 molded with the resin 230 is to be seated, is exposed to the exterior; and a connection step of seating and connecting the protective circuit module 217 molded with the resin 230 to a surface of the bare cell 211 exposed via the case 220.

If the alternative method is used, the height of the case 220 is slightly larger than that of the bare cell 211. Specifically, the height of the case 220 is equal to that of the bare cell 211 after subtracting the thickness of the bottom portion 223, of the case 220 from it. As a result, when the bare cell 211 is coupled to the case 220, a region of the bare cell 211 is exposed to the exterior via the case 220 but does not protrude from it.

After the bare cell 211 is fitted into the case 220, the protective circuit module 217, which has been previously molded with the resin 230, is electrically connected to conductive tabs 216a and 216b, which are exposed to the exterior via the bare cell 211, and is coupled to a space provided in the case 220. The polymer battery pack 200 manufactured in this method has the shape as shown in FIGS. 6 and 7. Specifically, most of the polymer battery pack 200 is enclosed by the case 220. This further improves the rigidity and reliability of the polymer battery pack 200.

As mentioned above, the polymer battery pack and the method for manufacturing the same according to the present invention are advantageous in that, since the pouch-type bare cell, which has a weak exterior, is coupled to a metallic case and the protective circuit module is molded with a resin, the external strength and reliability improve.

In addition, since the thickness of the case can be reduced by 0.1-0.2 mm, the capacity can increase as much as the space is reduced. Particularly, a space of about 0.8 mm is necessary for thermal bonding of the case using ultrasonic waves according to the prior art. However, the present invention does not need such a space. This makes it possible to actually contain a bare cell or core pack having a capacity of 850 mAh or larger.

Although examples of embodiments of the present invention have been described for illustrative purposes, those skilled in the art will appreciate that various modifications, additions and substitutions are possible, without departing from the scope and spirit of the invention as disclosed in the accompanying claims and their equivalents.

What is claimed is:

1. A pouch type battery pack comprising:
   a pouch;
   an electrode assembly enclosed in the pouch, comprising a first electrode, a second electrode and a separator interposed therebetween, each of the first and second electrodes having a tab extending outside the pouch;
   a case accommodating the pouch;
   a protective circuit module disposed to the pouch, and having an exposed portion exposed to an exterior of the case; and
   a resin enclosing at least partially the exposed portion of the protective circuit module,
   wherein the pouch has two folded portions spaced away from each other, and the protective circuit module is seated at a region between the two folded portions.

2. The pouch battery pack as claimed in claim 1, wherein the pouch comprises a first insulation layer, a metal foil, and a second insulation layer.

3. The pouch battery pack as claimed in claim 2, wherein: the first insulation layer comprises cast polypropylene (CPP); the metal foil comprises a material selected from the group consisting of aluminum, steel, and stainless steel; and the second insulation layer comprises a material selected from the group consisting of nylon and polyethylene terephthalate (PET).

4. The pouch battery pack as claimed in claim 2, wherein the protective circuit module is electrically connected to the tab.

5. The pouch battery pack as claimed in claim 1, wherein the protective circuit module comprises:
   a PCB having at least one electronic component mounted thereon; and
   at least one terminal positioned on a side of the protective circuit module while being exposed to an exterior of the resin.

6. The pouch battery pack as claimed in claim 1, wherein the case has a shape of a container with a closed end distal to the protective circuit module.

7. The pouch battery pack as claimed in claim 1, wherein the case comprises: long-sided portions spaced apart by a distance from each other; short-sided portions connecting ends of the long-sided portions to each other; and a bottom portion closing a common end of the long-sided portions and the short-sided portions.

8. The pouch battery pack as claimed in claim 1, wherein the case comprises a material selected from the group consisting of aluminum, steel, and stainless steel.

9. The pouch battery pack as claimed in claim 1, wherein the case has a thickness of 0.1-0.2 mm.

10. The pouch battery pack as claimed in claim 2, wherein the resin comprises a hot-melt resin having a melting temperature of 140-160° C.

11. The pouch battery pack as claimed in claim 1, wherein the protective circuit module and a region of the pouch, on which the protective circuit module is seated, protrude from the case and are molded together with the resin.

12. The pouch battery pack as claimed in claim 11, wherein the protective circuit module has at least one terminal formed thereon exposed to an exterior of the resin.

13. The pouch battery pack as claimed in claim 1, wherein the protective circuit module is molded with the resin and is coupled to the case to be electrically connected to the tab.

14. The pouch battery pack as claimed in claim 13, wherein the protective circuit module has at least one terminal formed thereon exposed to an exterior of the resin.

15. The pouch battery pack as claimed in claim 1, wherein the pouch has a thermally bonded region, and the protective circuit module is seated at the thermally bonded region.

16. The pouch battery as claimed in claim 1, wherein the resin encloses the protective circuit module from an end of the case.

* * * * *

UNITED STATES PATENT AND TRADEMARK OFFICE
CERTIFICATE OF CORRECTION

| | | |
|---|---|---|
| PATENT NO. | : 8,389,152 B2 | Page 1 of 1 |
| APPLICATION NO. | : 13/244432 | |
| DATED | : March 5, 2013 | |
| INVENTOR(S) | : Hyung Bok Lee et al. | |

It is certified that error appears in the above-identified patent and that said Letters Patent is hereby corrected as shown below:

In the Claims

Column 10, Claim 10, line 22    Delete "claim 2,"
                                                          Insert -- claim 1, --

Signed and Sealed this
Twenty-sixth Day of August, 2014

Michelle K. Lee
*Deputy Director of the United States Patent and Trademark Office*